May 28, 1968 G. P. MATHEWS ET AL 3,385,118
SEAL DEVICE
Filed Dec. 28, 1965
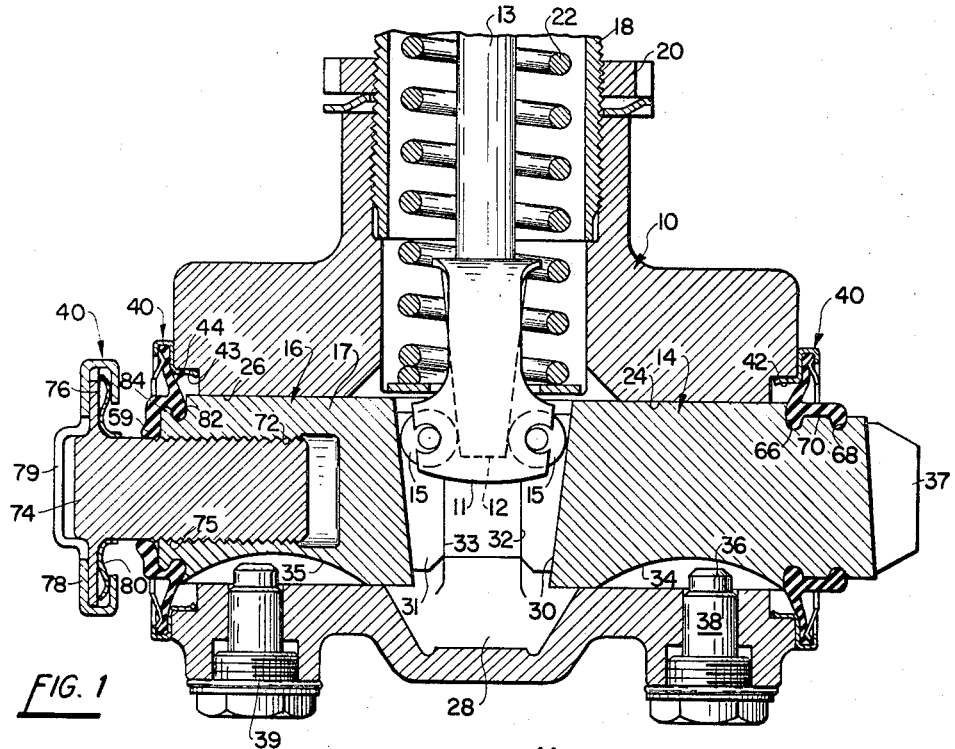
FIG. 1
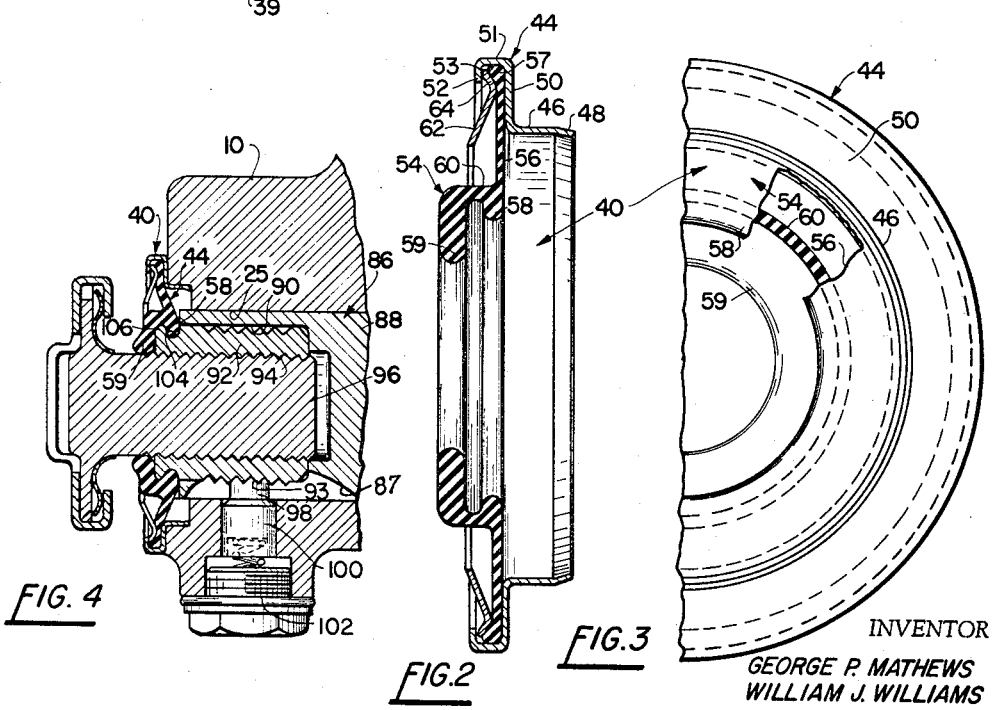
FIG. 4
FIG. 2
FIG. 3
INVENTOR
GEORGE P. MATHEWS
WILLIAM J. WILLIAMS
BY Strauch, Nolan, Neale,
Nies & Bronaugh
ATTORNEYS

United States Patent Office

3,385,118
Patented May 28, 1968

3,385,118
SEAL DEVICE
George P. Mathews and William J. Williams, Ashtabula, Ohio, assignors to Rockwell-Standard Corporation, Pittsburgh, Pa., a corporation of Delaware
Filed Dec. 28, 1965, Ser. No. 516,852
10 Claims. (Cl. 74—18.2)

ABSTRACT OF THE DISCLOSURE

A flexible seal device adapted to extend between a slidable brake shoe actuating plunger structure and an actuator housing comprises an elastomeric annulus of predetermined relaxed shape and an annular stiff retainer therefor, the annulus comprising a central hub having two axially spaced inwardly projecting plunger structure engaging lips and a radially outwardly extending axially flexible diaphragm terminating in an outer rim peripherally clamped to the retainer.

---

The present invention refers to seal devices and more particularly to vehicle brake actuator sealing arrangements.

The present invention will be described in its preferred embodiment as incorporated in a wedge actuated brake such as disclosed in United States Letters Patents No. 3,037,584 and No. 3,068,964.

In these patents the brake operator consists essentially of an actuator housing enclosing a wedge and roller assembly positioned between opposed plungers slidably mounted in the housing and adapted to be moved outwardly upon reciprocation of the wedge and roller assembly to displace a pair of brake shoes toward a relatively rotating brake drum. The plungers project from the housing and, due to relative sliding and rotating movements between the housing and the plungers, the mechanism must be lubricated and at the same time kept free from exposure to water, dirt or like foreign substances to avoid erosion and corrosion of the parts and consequent premature failure.

For this reason seals must be provided at the housing ends through which the plungers extend. Due to the sliding motion of a solid plunger such as an anchor plunger and the combined sliding and rotative motion of an adjustable length type plunger, ordinary face type seals have been found unsuitable in that the face at the contact area rapidly wears away and causes a defective seal. Furthermore, seals of different internal diameters are required for the anchor plunger and the adjustable plunger.

In connection with adjustable plungers, a further problem exists in sealing off not only the plunger bores in the housing but also the threads of adjustable plunger studs which during adjustment move both rotatively and axially relative to the seal. This has not been effectively accomplished in the past with the result that the threads of the plunger studs have been subjected to dirt and deterioration which hampers or completely prevents adjustment.

Applicant has discovered it to be of best advantage to use a diaphragm type seal rather than a face type seal, thus eliminating excess sliding friction between the sealing surfaces, and the invention is concerned with a novel seal device of the diaphragm type.

It is the primary object of the invention to provide an improved diaphragm type seal for mounting between two relatively movable members which minimizes sliding friction and provides a seal between adjacent surfaces.

A further object is to provide, in a brake acting mechanism containing extensible plungers, improved seal devices for the plungers, such seal devices being of such configuration and structure as to allow for relatively unimpeded longitudinal movement of the plungers outwardly of the enclosing housing without rupturing the seal or subjecting the seal surfaces to excessive sliding friction.

Another object of the invention is the provision of an improved seal device for a brake actuating mechanism containing extensible plungers which have resiliently adaptable sealing surfaces for sealing association with either a solid anchor plunger or a multi-part adjustable length plunger.

A further object of the invention is to provide a seal device of the diaphragm type having a novel dual lip resilient annulus.

Other objects and novel features will become apparent by the following detailed description in connection with the appended drawings in which:

FIGURE 1 is a section showing a wedge type brake actuator provided with seal devices according to a preferred embodiment of the invention, the seal device being shown applied to both solid and adjustable type plungers;

FIGURE 2 is an enlarged cross section through the seal device in relaxed state;

FIGURE 3 is a fragmentary elevation partly broken away and in section showing the seal device of FIGURE 2; and FIGURE 4 is a fragmentary view in section showing the seal device on another form of adjustable length plunger.

The brake actuator housing 10 of FIGURE 1 is normally rigid with a brake support (not shown) usually fixed to the axle. Housing 10 contains an actuator mechanism comprising a reciprocable wedge member 12 that carries at its end a caged dual roller assembly 11 extending between two opposed aligned plungers 14 and 16 slidably mounted within housing 10 for displacement at right angles to the direction of reciprocation of wedge member 12. Pushrod 13 of wedge member 12 is in the usual manner associated with a piston or diaphragm (not shown) of a conventional type hydraulic or air cylinder which is preferably attached to a tubular support 18 screwed into housing 10 and secured thereto by a nut and lockwasher assembly 20 to form a close-coupled unit therewith. A return spring 22 surrounding wedge member 12 normally biases wedge member 12 to retracted position when the brakes are disengaged.

The foregoing housing, wedge actuator mechanism, plunger arrangements and mounting structure are essentially as disclosed in the aforementioned patents and reference is made thereto for further detail. When wedge member 12 is moved inwardly of housing 10, plungers 14 and 16 are simultaneously displaced outwardly and to urge their associated brake shoes (not shown) against the brake drum, as disclosed in said patents.

Plungers 14 and 16 are longitudinally slidable within smooth axially aligned cylindrical bores 24 and 26 in housing 10 extending from internal chamber 28 to openings in opposite sides of the housing. Chamber 28 is filled with lubricant such as a light grease for effective lubrication of the plunger surfaces and the wedge and roller mechanism. To retain the lubricant within housing 10 and to prevent the entry of foreign matters into housing 10 along the plunger peripheral surfaces the sealing device of the invention is provided at the regions where the plungers leave the housing 10.

Plunger 14 is a one-piece non-adjustable or anchor plunger. It has an inclined slot 30 at its inner end to receive a roller 15 of the wedge and cage assembly 11. The inner end of plunger 14 may abut against an anchor surface 32 within the housing to limit inward movement of the plunger, and this condition may exist when the wedge is retracted as in FIGURE 1. To hold plunger 14 from rotation about its axis in bore 24, the cylindrical surface thereof is provided with a longitudinal slot 34 into which extends the tip 36 of a guide screw 38 removably mounted on the housing. The outer end of plunger 14 is slotted at 37 to non-rotatably receive the web of the associated brake shoe (not shown).

At its outer end, plunger bore 24 is sealed at its juncture with plunger 14 by the seal device 40 which is non-rotatably retained within a housing counterbore 42 at the outer end of plunger bore 24.

With reference to FIGURES 2 and 3, the seal device 40 comprises an annular retainer 44 of pressed sheet metal or like stiff material which has an axial cylindrical hub section 46 terminating in an inwardly inclined pilot lip 48 to facilitate insertion of the retainer within counterbore 42. In order to be securely held in counterbore 42 against both rotation and axial movements, the outer diameter of retainer hub section 46 is sufficiently larger than the internal diameter of counterbore 42 to have a press fit mounting therein.

Adjacent hub 46, retainer 44 has a flat annular radial flange portion 50 normal to the axis of the retainer, and the outer periphery is bent successively at right angles to form an axial section 51 and a radial flange 52 defining a generally U-shaped inwardly facing annular channel 53 disposed on the opposite side of flange 50 from hub 46.

Retainer 44 mounts an integral flexible sealing element 54 made of an elastomeric material such as rubber but preferably of a silicone compound having a high percentage of elongation and high tensile strength. Sealing element 54 comprises a flat annular diaphragm 56 that terminates in a thickened circular bead 57 around its outer periphery. At the inner periphery of diaphragm 56, an annular axial hub 60 projects from one side, and two axially spaced bulbous lips 58 and 59 project inwardly from the opposite ends of hub 60. Lip 58 is preferably an essentially inward extension of the diaphragm, and lip 59 is disposed at the outer end of hub 60. The inner diameter defined by outer lip 59 is smaller than that formed by inner lip 58 to provide two inner diameter seal throats of different dimensions for a purpose to appear.

Sealing element 54 is secured coaxially within retainer 44 at the outer portion of diaphragm 56. Seal element hub 60 projects oppositely from retainer hub. Bead 57 extends within retainer channel 53, and a suitable annular sheet metal washer 62 clamps bead 57 within the channel. The outer periphery of washer 62 is formed with an axially offset inclined rim 64 which in assembly extends into channel 53 between flange 52 and bead 57 to thus compressibly wedge and securely clamp the sealing element 54 on retainer 44. Alternately, the diaphragm 56 may be bonded to the retainer 44. In practice washer 62 is placed in position against bead 57 before flange 52 is bent over, and then flange 52 is forcibly bent over to tightly lock the washer in clamping engagement with bead 57. By providing thick bead 57 and selecting the direction of action of washer rim 64, the amount of sealing material displaced into diaphragm 56 when the seal retainer is crimped over at flange 52 to complete the assembly is minimized and can be effectively controlled. This control of displacement of the sealing material when the sealing element is assembled into the retainer is important since the designed diameters of the plungers and seal are intended to produce a controlled amount of squeeze of the sealing element on the metal parts so that, as in the case of an adjustable plunger, the adjusting member can rotate within the sealing element while maintaining an effective seal, as will be described hereafter.

The anchored plunger 14 has two parallel circumferential grooves 66 and 68 near the outer end of the plunger spaced apart by a continuous annular ridge 70. Seal device 40 is assembled around plunger 24 in such manner that, after hub 46 has been press fitted into counterbore 42, inner smaller lip 58 will extend into the inner groove 66 and the larger outer lip 59 will extend into the outer groove 68. Grooves 66 and 68 may be substantially the same diameter. The lips are sized to resiliently contract and tightly fit within the grooves for providing a tight outer and inner seal on the plunger surface. Here the hub 60 of the seal element is axially stretched across bridge 70.

In operation seal device 40 is subjected only to flexure arising from axial displacement of plunger 14 which is accommodated by the relatively thin diaphragm 56 of sealing element 54, and there is therefore no frictional sliding of the elastomeric seal surfaces on either the plunger or housing. The elastomeric seal element therefore is sealingly tightly anchored at its outer and inner peripheries to the housing and plunger 14 respectively and the flexure of diaphragm 56 does not alter this seal.

Adjustable plunger 16 in FIGURE 1 is of the manually adjustable type. Its body 17 is provided with an inclined slot 31 to receive the other roller 15 of wedge and cage assembly 11, and it normally abuts against a similar anchor surface 33 within housing 10 to limit inward displacement. Plunger body 17 is prevented from rotation within bore 26 by the provision in its cylindrical surface of an axial slot 35 into which extends the tip of a removable guide screw 39 on the housing.

Plunger body 17 is axially provided with a blind, threaded bore 72 which rotatably threadingly receives an adjusting stud 74 for axial movement in and out of body 17 upon rotation of the stud, to thus vary the effective length of the entire plunger 16. This adjustment is to compensate for brake lining wear on the shoes. To effect rotation of the stud 74 about its axis, the stud is provided at its outer end with a star wheel 76 normally locked against rotation by a brake shoe retainer 78 held in contact with the star wheel by a bowed plate spring 80. Retainer 78 is slotted at 79 to non-rotatably receive the associated brake shoe web. The foregoing star wheel and retainer assembly is disclosed and claimed in copending application Ser. No. 343,696, filed Feb. 10, 1964, now U.S. Letters Patent No. 3,227,247 issued Jan. 4, 1966, and forms no part of this invention.

To seal the space between plunger bore 26 and plunger 16, the same seal device 40 is used. For mounting it in assembly, however, plunger body 17 is formed with only one circumferential groove 82 located near the outer end of its cylindrical periphery and into which the inner larger diameter lip 58 of sealing element 54 tightly extends after the retainer has been press-fitted into a similar housing counterbore 43 at the outer end of bore 26. The outer smaller diameter lip 59 passes around ridge 84 at the plunger body end and extends inwardly along the outer end surface of plunger body 17 to sealingly grip and engage the peripheral surface of stud 74.

Stud 74 is of larger diameter than the free inner diameter of lip 59 so that sealing lip 59 will be radially compressed sufficiently to form a tight seal around the surface of stud 74 to thus effectively seal the threaded bore 72 against entry of foreign matter, and prevent lubricant from escaping. Prior to assembly sealing lip 59 is preferably coated with a lubricant to prevent its being chafed or otherwise damaged by the adjacent threads 75 of stud 74 when the stud moves with respect to body 17. Engagement of lip 59 with stud threads 75 is preferably such that always a full thread next adjacent the body 17 will be bridged by the lip and protected against exposure.

Thus, seal device 40 here performs two sealing functions by sealing off the plunger bore 26 at inner lip 58, and sealing off threaded bore 72 at outer lip 59. In addition to the flexible diaphragm action to which sealing element 54 is subjected by reciprocation of plunger assembly 16, outer lip 59 is designed to absorb the relatively small rotating and sliding friction encountered when adjusting stud 74 shifts in or out of plunger body 17 during brake lining wear compensation adjustment in length of plunger 16.

FIGURE 4 illustrates the installation of the seal device of FIGURES 2 and 3 on the automatically longitudinally adjustable plunger 86 of a wedge actuator assembly. The plunger here comprises a body 88 slidable in a cylindrical bore 25 of housing 10. Body 88 is provided with an axial large blind cylindrical bore 90 into which slidingly fits an intermediate ratchet sleeve 92 having a threaded through bore 94 to rotatably receive a threaded adjusting stud 96 similar to adjusting stud 74 of FIGURE 1.

Ratchet 92 is provided around its outer circumference with helical teeth 93 which are engaged by a pawl 98 on the end of a spring biased stud 100 that extends through a guide slot 87 in plunger body 88 and thus simultaneously functions to prevent body 88 of the plunger from rotation within bore 25 and to control the axial movement of stud for compensation adjustment.

Stud 100 is resiliently held in engagement with helical teeth 93 by a spring and capscrew assembly 102.

This structure of the automatic adjusting plunger and its function are more fully disclosed and described in the aforementioned United States Patent No. 3,068,964 to which reference is made for detail.

Seal device 40 is also used in FIGURE 4. Ratchet 92 is provided with a circumferential groove 104 near its outer end into which the inner lip 58 of the sealing element 54 extends after the retainer has been press-fitted into housing counterbore 43. Plunger bore 25 and blind bore 90 in plunger body 88 will thus be sealed off by the inner lip 58. Outer sealing lip 59 extends over and around the ridge 106 formed between circumferential groove 104 and the end of the plunger structure and downwardly along the end face of ratchet 92 to circumferentially grip the threaded external surface of adjusting stud 96, to thus seal the threaded bore 94.

The sealing lips are preferably coated with a lubricant to reduce friction wear at the multiple sliding and rotating sealing surfaces.

The present invention provides an improved universal sealing means consisting essentially of a single seal device adaptable for a variety of diverse applications to provide an effective seal between relatively longitudinally movable and rotatable members. Thus, in one application the device may provide a simple peripheral diaphragm type seal for a reciprocating member as in FIGURE 1 at plunger 14; in another application the device provides a combined peripheral diaphragm type seal for a reciprocating member and a face and peripheral seal for an intermittently rotating and sliding threaded member, as at plunger 16 in FIGURE 1, and in still another application the device provides a diaphragm type seal for a reciprocating member, a peripheral seal for an intermittently rotating member and a combined face and peripheral seal for an intermittently rotating and sliding threaded member, as in FIGURE 4.

The present novel seal device is a self-retaining unit and the sealing element is of such elasticity as to be self-retained on the moving plunger without the use of clamps or other auxiliary securing means.

Although there are many suitable elastomers available of which the sealing element 54 may be made it is preferably a molded silicone compound of the following approximate properties:

| | |
|---|---|
| Durometer hardness | 45–55 |
| Tensile strength p.s.i. | 800 |
| Elongation percent | 230 |
| Tear strength p.s.i. | 50 |

This material has excellent flow characteristic and is durable for the particular applications falling within the scope of the present invention.

The present invention may be embodied in other forms without departing from the spirit and essential characteristic thereof, therefore, the present embodiments are to be considered in all respects as illustrative only and not restrictive, the scope of the invention being indicated by the appended claims rather than by the foregoing description.

We claim:

1. A seal device comprising an integral annulus of elastomeric material formed to a predetermined relaxed shape and an annular stiff retainer therefor, said annulus comprising a central hub having two axially spaced inwardly projecting lips and a radially outwardly extending flexible diaphragm terminating in an outer rim, said lips being of different effective diameter, the larger diameter lip being adjacent said diaphragm, means axially clamping said rim to the retainer while permitting flexure of said diaphragm to enable axial displacement of said hub relative to said rim, and means on said retainer for mounting it upon a mechanism to be sealed.

2. The seal device defined in claim 1 wherein the rim of said annulus is a thickened bead and said retainer is formed with an inwardly open annular channel within which said bead is compressibly clamped.

3. The seal device defined in claim 2, wherein said retainer is an integral part and said axial clamping means for the elastomeric annulus is a stiff annular member having its periphery engaging said bead and clenched within the channel.

4. The seal device defined in claim 1, wherein said annulus is an integral molded element of a silicone compound.

5. The seal device defined in claim 1, wherein said hub of the annulus projects to one side of the diaphragm when the device is in relaxed condition.

6. The seal device defined in claim 1, wherein said retainer has an axially projecting hub for mounting upon said mechanism, and said hub of the annulus projects oppositely from said retainer hub.

7. In an actuator assembly for a vehicle brake of the type wherein at least one movable brake shoe is operatively displaced by a plunger structure slidably mounted in and projecting from a bore in an actuator housing, the improvement comprising the provision of a circumferential groove on the plunger structure outside said bore and a seal device mounted on the housing surrounding the projecting plunger structure, said seal device comprising an integral elastomeric annulus having an outer rim fixed with respect to said housing, a hub formed with an annular internal lip projecting tightly within said external face groove to resiliently grip the plunger therein and a relatively thin flexible annular diaphragm extending radially between said rim and said hub, said plunger structure being of the adjustable length type wherein a threaded stud is rotatably adjustably mounted within and projects outwardly from a threaded bore in the surrounding plunger structure which is axially slidable in said bore and said plunger groove being formed in said surrounding plunger structure, and a second internal integral lip provided on said hub axially outwardly spaced from said first lip in the actuator assembly and extending past the outer end of said surrounding plunger structure to radially compressibly sealingly surround and resiliently grip said stud where it projects outward from said plunger structure.

8. In the actuator assembly defined in claim 7, said slidable plunger structure consisting of a plunger body slidable axially within said housing bore.

9. In the actuator assembly structure defined in claim 7, said slidable plunger structure comprising a plunger body axially slidable within said housing bore and a ratchet sleeve axially slidable within said body and formed with said circumferential groove, and said threaded stud being mounted in a threaded bore in said ratchet.

10. In an actuator assembly for a vehicle brake of the type wherein at least one movable brake shoe is operatively displaced by a plunger structure slidably mounted in and projecting from a bore in an actuator housing, the improvement comprising the provision of two axially spaced circumferential grooves of substantially the same diameter on the plunger structure outside said bore and a seal device mounted on the housing surrounding the projecting plunger structure, said seal device comprising an integral elastomeric annulus having an outer rim fixed with respect to said housing, a hub formed with two axially spaced annular internal lips projecting tightly withing said external surface grooves to resiliently grip the plunger structure therein and a relatively thin flexible annular diaphragm extending radially between said rim and said hub, the outer of said lips normally having a smaller effective diameter than the inner lip, and said hub being axially stretched along the plunger structure surface between said grooves.

References Cited

UNITED STATES PATENTS

| | | | |
|---|---|---|---|
| 2,149,040 | 2/1939 | Binder et al. | 74—18.2 X |
| 2,305,265 | 12/1942 | Le Tourneau | 74—18.1 X |
| 2,896,987 | 7/1959 | Meyer | 74—18.2 |
| 3,302,473 | 2/1967 | Lowry et al. | 74—110 |

FRED C. MATTERN, JR., *Primary Examiner.*

F. D. SHOEMAKER, *Assistant Examiner.*

UNITED STATES PATENT OFFICE
CERTIFICATE OF CORRECTION

Patent No. 3,385,118                         May 28, 1968

George P. Mathews et al.

It is certified that error appears in the above identified patent and that said Letters Patent are hereby corrected as shown below:

Column 5, line 70, before "durable" insert -- most --.
Column 6, line 49, "face" should read -- surface --.

Signed and sealed this 14th day of October 1969.

(SEAL)
Attest:

Edward M. Fletcher, Jr.                      WILLIAM E. SCHUYLER, JR.
Attesting Officer                              Commissioner of Patents